United States Patent Office 3,657,306
Patented Apr. 18, 1972

3,657,306
POLYFLUOROISOALKOXYALKYL ISOCYANATES
John J. Murray, Millington, N.J., assignor to Allied
Chemical Corporation, New York, N.Y.
No Drawing. Filed Oct. 21, 1969, Ser. No. 868,216
Int. Cl. C07c 119/04
U.S. Cl. 260—453 AL                                  25 Claims

ABSTRACT OF THE DISCLOSURE

Compounds of the formula

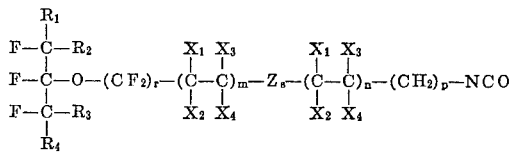

wherein $R_1$–$R_4$ can be fluorine, chlorine or perhaloalkyl, the halo portions being fluorine or chlorine; $X_1$–$X_4$ can be hydrogen, fluorine, chlorine or bromine; Z is $$-CH_2-CH_2-$$

or —CH=CH—; $r$ is an integer from 1 to 2, $m$ and $n$ are integers from 0 to 20 and $s$ and $p$ are integers from 0 to 1. These compounds are surface active agents and can be used to impart oil and water repellent properties to materials such as textiles and leathers.

BACKGROUND OF THE INVENTION

A variety of polyfluoroisocyanates are known, see for example, U.S. Pat. Nos. 2,617,817 and 2,706,733. The isocyanates of these patents, however, are extremely reactive towards moisture and thus moisture must be totally excluded in their preparation and in the synthesis of their derivatives.

SUMMARY OF THE INVENTION

The isocyanates of the instant invention have the formula

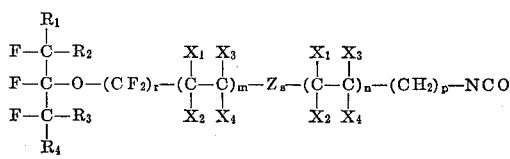
(I)

wherein (a) $R_1$–$R_4$ can be independently selected from the group consisting of fluorine, chlorine, and perhaloalkyl of 1 to 10 carbon atoms, or one of $R_1$ and $R_2$ and one of $R_3$ and $R_4$ when taken together may form a perhalocycloalkyl structure, the halo portions of $R_1$–$R_4$ being fluorine or chlorine, with the provisos that each carbon atom of $R_1$–$R_4$ contain at least one fluorine atom, no more than three of the $R_1$–$R_4$ groups are perhaloalkyl groups, $R_1$ and $R_2$ cannot both be chlorine and $R_3$ and $R_4$ cannot both be chlorine; preferably $R_1$–$R_4$ are fluorine or perfluoroalkyl groups of 1 to 3 carbon atoms.

(b) $X_1$–$X_4$ independently can be hydrogen, fluorine, chlorine or bromine, provided that each $X_1$–$X_4$ group does not include more than two chlorine atoms or one bromine atom, and when $X_1$ and $X_3$ independently are each hydrogen or fluorine, each of $X_2$ and $X_4$ independently may be $R_5$ wherein $R_5$ is a haloalkyl radical of 1 to 9 carbon atoms in which the halogen atoms are fluorine, chlorine or bromine, the $(X_1X_2C-CX_3X_4)_m$ and $(X_1X_2C-CX_3X_4)_n$ moieties may be the same or different; preferably $X_1$–$X_4$ are hydrogen, fluorine or chlorine.

(c) Z is —CH$_2$—CH$_2$— or —CH=CH—, with the proviso that when Z is —CH=CH, one of $X_3$ or $X_4$ in the —($X_1X_2C-CX_3X_4$)$_m$ moiety must be a halogen atom.

(d) $r$ is an integer from 1–2, $m$ and $n$ are integers from 0–20, the sum of $m$ and $n$ is 0–20, preferably $m$ and $n$ are each 0–10, $s$ and $p$ are integers from 0–1; with the proviso that when $p$ is 0, $n$ must be at least one and $X_3$ and $X_4$ in the $(X_1X_2C-CX_3X_4)_n$ moiety must be hydrogen.

The criticality in the structure of the above described compounds is in the polyfluoroisoalkoxyalkyl tail portion of the molecule wherein an ether oxygen atom links a fluorinated carbon atom attached to two fluoroalkyl groups and at least one —CF$_2$— group.

The novel compounds of this invention are relatively inert to moisture and thus may be prepared in the presence of water.

The novel compounds of this invention are useful as surface active agents in that they decrease the surface tension of aqueous solutions and of many organic solvents. The compounds also impart oil and water repellent properties to such materials as textiles and leather.

DETAILED DESCRIPTION

The compounds of this invention may be prepared by reacting the corresponding polyfluoroisoalkoxyalkyl carboxylic acid first with thionyl chloride and then with an alkali metal azide, preferably with sodium azide. The reactions can be illustrated by the following equations wherein $R_f$ stands for the moiety

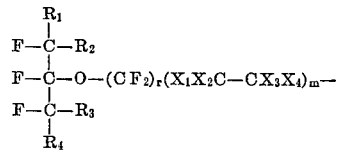

(1) $R_fZ_s(X_1X_2C-CX_3X_4)_n(CH_2)_pCOOH \xrightarrow{SOCl_2} R_fZ_s(X_1X_2C-CX_3X_4)_n(CH_2)_pCOCl$ (2) $R_fZ_s(X_1X_2C-CX_3X_4)_n(CH_2)_pCOCl \xrightarrow{NaN_3} R_fZ_s(X_1X_2C-CX_3X_4)_n(CH_2)_pCON_3$ (3) $R_fZ_s(X_1X_2C-CX_3X_4)_n(CH_2)_pCON_3 \xrightarrow{Heat} R_fZ_s(X_1X_2-C-CX_3X_4)_n(CH_2)_pNCO$ In the above method of preparation a solution of polyfluoroisoalkoxyalkyl carboxylic acid in thionyl chloride is heated to reflux temperature for a period of from about one hour to five hours. The reaction solution is then cooled, preferably to about 20° C. and the excess thionyl chloride evaporated off. The residual acid chloride is then dissolved in a non-reactive organic solvent, preferably benzene, and temperature of the solution is kept below 30° C., preferably about 5°–10° C. N,N-dimethylaniline is added to the solution to complex the acid chloride and increase reaction rate. A water solution containing about 25 weight percent sodium azide is added slowly to the acid chloride solution and the temperature maintained at below 30° C., preferably at about 5°–10° C., for from 0.5 to 3.0 hours. The low temperature is maintained so as to prevent hydrolysis of the acid chloride. The benzene layer is then separated, extracted with ice cold 10% HCl, then with ice cold water, and then dried. The dried benzene layer is heated at reflux temperature for about 0.5 to 3.0 hours, during the initial stages of which there is rapid nitrogen evolution. The solution is then evaporated to dryness to yield the isocyanate product of this invention.

Preferably the mole ratio of thionyl chloride to carboxylic acid is from about 1:1 to about 20:1, most preferably from about 2:1 to about 10:1, and the mole ratio of sodium azide to carboxylic acid is preferably about 1:1 to about 3:1, most preferably from about 1:1 to about 1.5:1. The N,N-dimethlaniline to carboxylic acid mole ratio is preferably from about 0.2:1 to about 0.8:1.

The sodium azide reactant is commercially available and may be used in its normal inactivated form or in its activated form prepared as described in Organic Reactions, volume III, page 382, J. Wiley (1946). Most preferred is the activated sodium azide.

The polyfluoroisoalkoxyalkyl carboxylic acid starting materials may be prepared by one or more of the following methods:

(1) The carboxylic acids can be prepared by reacting the corresponding polyfluoroisoalkoxyalkyl iodide with a water-soluble metal cyanide to form the corresponding nitrile. Any water-soluble metal cyanide can be employed in this reaction, including sodium cyanide, potassium cyanide, lithium cyanide, cuprous cyanide, etc. Excellent results are obtained with sodium cyanide. Preferably 1–3 moles of cyanide per mole of telomer iodide are employed. Larger amounts can be employed, but are of no advantage.

The reaction time is not critical and is dependent upon the temperature employed. Since the yield of nitrile increases at higher temperatures of reaction, when low reaction temperatures are employed, longer reaction times will be required for optimum conversion. Generally reaction for from 0.5 to 5 hours is satisfactory.

The reaction between the iodide and the alkali metal cyanide is preferably carried out in the presence of a solvent. Good yields are obtained at temperatures between about 60–120° C., preferably up to about 90° C. Atmospheric pressure can be employed most conveniently, but superatmospheric pressure can be employed to good advantage in some cases to improve the conversion and/or yield. Suitable solvents for the reaction are water-soluble, polar solvents such as ethanol, diethylene glycol, dimethylformamide, dimethylsulfoxide and the like. Excellent results are obtained with dimethylsulfoxide. The solvent should be present in sufficient amount to afford an easily stirrable mixture of the alkali metal cyanide, telomer iodide and resultant salt by-product. Suitably, at least about one mole of solvent is employed per mole of alkali metal cyanide.

The product can be purified by conventional means. The product is washed with water to remove solvent, by-product salt and unreacted alkali metal cyanide. The oily product can be fractionally distilled to further purify it, as will be known to one skilled in the art.

The nitrile can be hydrolyzed to the corresponding free acid by well-known methods. An aqueous mineral acid, such as concentrated hydrochloric, 30–80% by weight sulfuric or phosphoric acids can be employed. The reaction can be carried out at normal temperatures and is preferably conducted at about the reflux temperature of the mixture. Generally, from 1–10, preferably from 5–10, moles of acid per mole of nitrile is employed. The crude acid can be further purified in conventional manner.

The above reactions are described in copending U.S. application Ser. No. 772,831, filed Nov. 1, 1968, the pertinent subject matter of which is hereby incorporated by reference.

(2) The fluorocarbon carboxylic acids can also be prepared by reacting a suitable polyfluoroisoalkoxyalkyl iodide with a terminally unsaturated hydrocarbon carboxylic acid or its corresponding ester to form the corresponding iodocarboxylic acid or ester. This reaction can be catalyzed by a free radical initiator such as heat or ultraviolet light, but preferably a catalyst such as a peroxide or an azonitrile is employed. These initiators are well known. This reaction can be illustrated by the following equation:

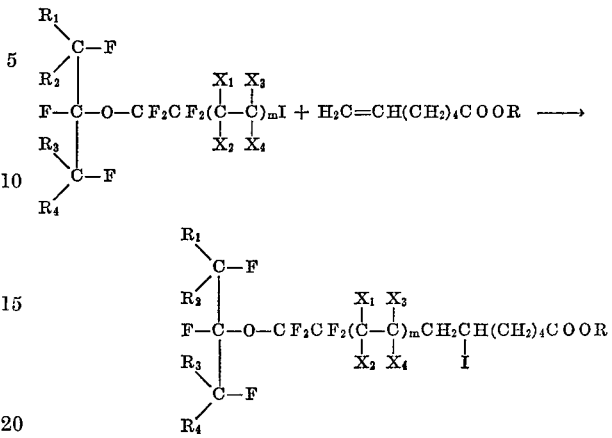

wherein $R_1$–$R_4$, $X_1$–$X_4$ and $m$ have the meanings given above, and R can be hydrogen or an alkyl group. The resultant iodocarboxylic acid or ester can be reduced in conventional manner, as with zinc in alcohol. The ester can be hydrolyzed to the free acid in known manner. Alternatively, the iodo ester can be dehydrohalogenated with alkali to the corresponding alkenoic acid and then, if desired, hydrogenated in known manner, as with hydrogen in the presence of a catalyst, such as platinum oxide. This method is described by N. O. Brace, J. Org. Chem., 27 4491 (1962).

(3) Reaction of the corresponding polyfluoroisoalkoxyalkyl iodide with $SO_3$ to form the corresponding pyrosulfate, or with oleum to form the corresponding hydrosulfate, hydrolysis of the pyrosulfate or the hydrosulfate with aqueous acid to form the corresponding alcohol, followed by oxidation of the alcohol with dichromate, permanganate or strong nitric acid to form the free acid, as shown below. In the following illustrative equations $R_f$ is as defined above:

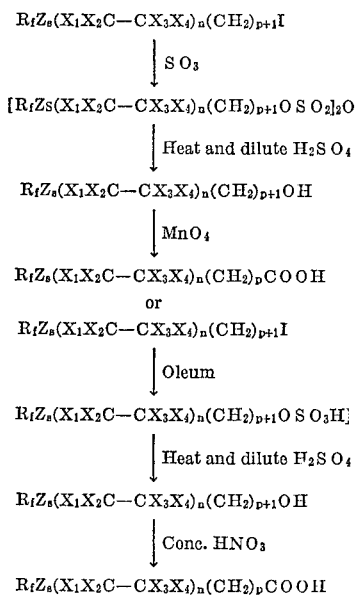

The above reactions are described in greater detail in copending U.S. application Ser. No. 721,117, filed Apr. 12, 1968, the pertinent subject matter of which is hereby incorporated by reference. Oxidation of the alcohols with nitric acid, preferably in the presence of small amounts of $V_2O_5$ as catalyst, is a preferred method.

The polyfluoroisoalkoxyalkyl iodides used in methods (1) to (3) above, and the preparation thereof, are disclosed in copending application Ser. No. 633,359 filed Apr. 25, 1967, now U.S. Pat. No. 3,514,487 and in corresponding Belgian Pat. 714,162, the pertinent subject matter of both being hereby incorporated by reference. Essentially, these iodides, referred to as telomers in the above application and patent, may be prepared by telomerizing telogens of the formula:

(II)

wherein $R_1$, $R_2$, $R_3$ and $R_4$ are as indicated above. The reaction of the telogens of Formula II with a suitable telomerizable unsaturated material will give repeating units of the radical $—(X_1X_2C—CX_3X_4)—$ in the molecule. For example,

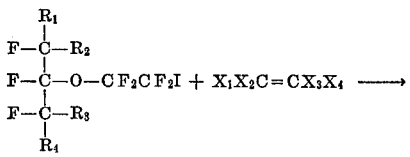

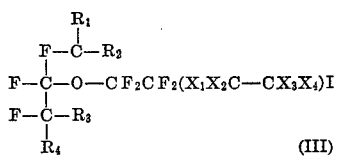
(III)

A telogen iodide containing only one $—CF_2—$ group linking the oxygen and iodine atoms can be prepared by the following procedure:

The polyfluoroisoalkoxyalkyl iodide telogen of Formula II is reacted with sulfur trioxide to form an acid halide. This reaction is carried out at temperatures between about 50–175° C. Preferably, an excess of $SO_3$ is used and sufficient pressure is employed to maintain the reactants in liquid phase. The acid halide is hydrolyzed to the acid by refluxing in water. The resulting acid has a single carbon atom linking the oxygen atom with the carboxy group. This acid can then be converted to the corersponding telogen iodide possessing a single carbon atom linking the oxygen and iodine atoms by the well known Hunsdiecker reaction which involves reacting the acid with alkali-free silver oxide ($Ag_2O$) to form the silver salt, followed by reaction of the silver salt with powdered iodine to form the iodide. This telogen iodide can then be telemerized with one or more olefins. Illustrative procedures are shown as follows:

For example, dehydroiodinating the (A) and (B) product mixture with KOH at 75–150° C. preferentially converts product (A) to the corresponding olefin which can then be readily separated from product (B) by distillation.

For the special case where $m$ and $n$ are 0 and $p$ and $r$ are one, the iodide starting materials can be obtained by reacting a telogen of Formula II with $SO_3$, esterifying the resulting reaction products, reducing the ester to the alcohol with $LiAlH_4$ as reducing agent and reacting the alcohol with p-toluene sulfonyl chloride and metallic iodide to form the iodide containing one $—CF_2—$ group and one $—CH_2—$ group.

The telomerization reaction is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150–200° C. Furthermore, although the reaction may be conducted at atmospheric pressure, superatmospheric pressures, for example, up to about 20,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the telomerization reaction may be conducted by use of a catalyst or light of sufficient intensity to initiate the free radical reaction. Illustrative free radical generating catalysts include azonitriles such as alpha, alpha'-azobisisobutyronitrile and organic peroxides such as benzoyl peroxide, acetyl peroxide and pelargonyl peroxide. The use of such initiators allows operation at a lower temperature, but gives a somewhat more complex product mixture because of incorporation of catalyst fragments in the telomer mixture, or results in a higher molecular weight distribution in the telomer product.

The telomerization reaction may be carried out in various ways. For example, the telogen and the unsaturated

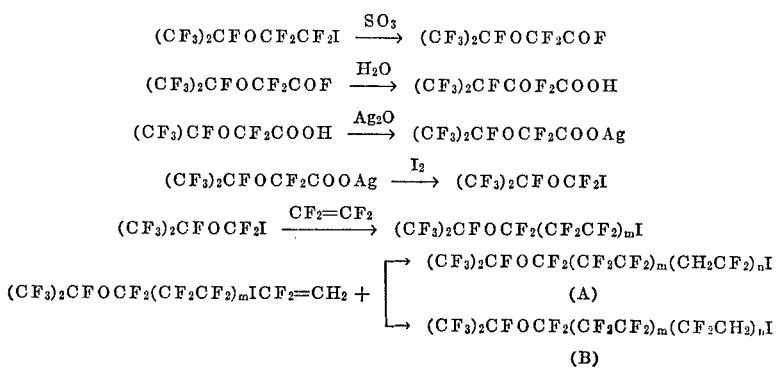

It should be noted that the above-noted telomerization reaction produces two products (A) and (B). The (A) product is obtained in about a 95% yield. The (B) product is obtained in about a 5% yield. The (A) and (B) products can be separated by conventional procedures.

compound may be introduced into an autoclave which is then sealed and heated, preferably with agitation such as by stirring or shaking until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e., telomers containing up to about 6 or 7 monomer units per telomer molecule. On the other hand, in a constant pressure reaction, i.e., where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions or narrower ranges of molecular weights having a desired viscosity or other properties.

The telogen starting materials may be prepared by reaction of an appropriate halogenated ketone with an ionizable fluoride salt to form a fluorinated organic salt and then reacting the organic salt with a halogen other than fluorine (e.g., iodine, bromine) and an appropriate olefin to form the desired telogen. This reaction is more fully described in co-pending applications of Litt et al. Ser. No. 492,276, filed Oct. 1, 1965 now U.S. Pat. 3,453,333 and Litt et al., Ser. No. 513,574, filed Dec. 13, 1965, now U.S. Pat. 3,470,256, the pertinent subject matter of which is hereby incorporated by reference. For example, as is described in Examples 1 and 3 of the former application, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula $(CF_3)_2CFO^-K^+$ and thereafter reacting this addition compound with tetrafluoroethylene and iodine in the presence of an inert organic solvent to from the desired perfluoroisopropoxyethyl iodide, $$(CF_3)_2CFOCF_2CF_2I$$

Telomers according to Formula III, above, may be obtained by telomerizing a telogen of Formula II with a telomerizable unsaturated compound. The telomerizable unsaturated compound may be the same or different from that used as reactant with the fluorinated organic salt and halogen in preparation of the telogen starting materials. Compounds according to Formula I wherein both $m$ and $n$ are 1 or over, may be obtained by reacting a suitable telogen with a first telomerizable unsaturated material to form a telomer and then reacting the telomer thus produced with a second telomerizable unsaturated material which may be the same or different as the first telomerizable unsaturated material.

As can be seen from the above description, the telomers produced can serve as telogens for further reactions. The term telogen will be used in this sense herein. In other words, the telogen may be a telomer product produced from the telogen which telomer produced is further telomerizable.

Preferred telomerizable unsaturated materials are selected from the group consisting of $CF_2=CF_2$, $CF_2=CH_2$, $CF_2=CClF$, $CF_3CF=CF_2$ and $CH_2=CH_2$, which yield $(X_1X_2C—CX_3X_4)$ moieties of the formula $—CF_2—CF_2—$, $—CF_2—CH_2$, $—CF_2—CClF—$, $$—CF_2—CF(CF_3)—$$

and $—CH_2—CH_2$, respectively. Other suitable telomerizable unsaturated materials include the following:

$CCl_2=CH_2$,
$CFH=CH_2$,
$CClH=CH_2$,
$CFH=CF_2$,
$CFH=CFH$,
$CClH=CClH$,
$CF_2=CFBr$,
$CF_2ClCF=CH_2$,
$CF_3CH=CF_2$,
$CF_3CCl=CF_2$,
$CF_3CF=CFCl$,
$CF_3CH=CFCl$,
$CFCl=CFCl$,
$CF_3CF=CF_2$,
$CF_2ClCF=CF_2$,
$CF_2BrCF=CF_2$,
$CF_3CF=CFCF_3$,
$CHF=CFCFCl_2$,
$CHF=CFCF_3$,
$CF_2=CFCHClCH_3$,
$CF_2=CHCF_2CH_3$,
$CF_2=CHCF_2CH_2Cl$,
$CHCl=CFCF_3$.

Many more suitable telomerizable unsaturated compounds subject to the restrictions of the definition for the compounds of Formula I given above, will readily occur to one of ordinary skill in the art.

DESCRIPTION OF THE PREFERRED EMBODIMENTS

A preferred class of compounds within the scope of the invention has the formula $$\begin{array}{c} R_1 \\ | \\ F—C—R_2 \\ | \\ F—C—O—(CF_2)_vZ_s(CH_2)_wNCO \\ | \\ F—C—R_3 \\ | \\ R_4 \end{array} \quad (IV)$$

wherein $R_1$–$R_4$, $Z$ and $s$ are as defined above and $v$ and $w$ are integers from 1–20, preferably from 1–10. The preferred class of compounds may be prepared by one or more of the aforementioned methods of preparation.

Especially preferred are the following compounds:

$(CF_3)_2CFO(CF_2)_2(CH_2—CH_2)(CH_2)_3NCO$ $(CF_3)_2CFO(CF_2)_4(CH_2—CH_2)(CH_2)_3NCO$ $(CF_3)_2CFO(CF_2)_6(CH_2—CH_2)(CH_2)_3NCO$ $(CF_3)_2CFO(CF_2)_8(CH_2—CH_2)(CH_2)_3NCO$ $(CF_3)_2CFO(CF_2)_2(CH=CH)(CH_2)_3NCO$ $(CF_3)_2CFO(CF_2)_4(CH=CH)(CH_2)_3NCO$ $(CF_3)_2CFO(CF_2)_6(CH=CH)(CH_2)_3NCO$ $(CF_3)_2CFO(CF_2)_8(CH=CH)(CH_2)_3NCO$

Specific examples of embodiments of the novel compounds of the invention as defined by both Formula I and Formula IV include the following:

1.
$$FC(CF_3)_2-OCF_2CH_2-NCO$$

2.
$$\begin{array}{c}F\\|\\FC-Cl\\|\\FC-O-(CF_2)_2(CH_2-CH_2)(CHCl-CHCl)_{20}CH_2-NCO\\|\\FC-F\\|\\(CFCl)_9CF_2Cl\end{array}$$

3.
$$\begin{array}{c}(CF_2)_9CF_3\\|\\C-F_2\\|\\FC-OCF_2(CF_2-CFBr)(CH=CH)(CH_2-CH_2)_{10}-NCO\\|\\CF_3\end{array}$$

4.
$$\begin{array}{ccc}(CF_3)_2 & & \\ FC & & \\ FC-O-CF_2(CF_2-CF)(CH_2-CH)CH_2-NCO & & \\ FCF \quad CF_2 \quad (CF_2)_8 & & \\ C(CF_3)_3 \quad (CH_2)_7 \quad CF_3 & & \\ CH_3 & & \end{array}$$

5.
$$\begin{array}{c}(CF_2)_2CF_3\\|\\FC-F\\|\\FC-O-(CF_2)_2-(CF_2-CF_2)_{10}(CCl_2-CH_2)_{10}CH_2-NCO\\|\\FC-F\\|\\(CF_2)_2CF_3\end{array}$$

6.
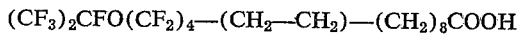
$$(CF_2)_3 \underset{CF_2}{\overset{CF_2}{\diagup\!\!\!\diagdown}} FC-O-CF_2(CF_2-CF_2)_4(CF_2-CH_2)_2-NCO$$

7. $(CF_3)_2CFO(CF_2)_{20}(CH_2-CH_2)(CH_2)_{20}-NCO$

8.
$$\begin{array}{c}(CFCl)_2CF_3\\|\\CF_2\\|\\FC-O(CF_2)_{10}(CH=CH)(CH_2)_{10}-NCO\\|\\CF_2\\|\\CF_3\end{array}$$

The invention can be more fully understood by reference to the following examples. Analyses are in weight percent.

Example 1

A mixture of 258 grams (0.455 mole) of $$(CF_3)_2CFO(CF_2)_4-(CH_2-CH_2)-(CH_2)_8COOH$$

and 410 grams (3.44 mole) thionyl chloride was heated to reflux over a period of 40 minutes and then maintained at reflux for 3 hours. The reaction mixture was then cooled to room temperature and the excess thionyl chloride evaporated off under vacuum to give 267 grams (99% yield) of crude acid chloride.

The crude acid chloride was dissolved in 750 ml. of benzene at 10° C. and 24.2 grams (0.20 mole) of N,N-dimethylaniline was added over 15 minutes. Temperature was dropped to 5° C. A solution of 32.5 grams (0.50 mole) of "activated" sodium azide and 100 ml. of water was then added dropwise over a period of 20 minutes maintaining the temperature less than 10° C. The reaction mixture was stirred at 5–10° C. for 30 minutes, and then at room temperature for 1½ hours. The benzene layer was separated and extracted twice with 150 ml. of ice cold 10% hydrochloric acid, once with 200 ml. of ice cold water, and then dried it over anhydrous sodium sulfate. The dried solution was heated to reflux over a period of 30 minutes and maintained at reflux for 2 hours. Evaporation to dryness gave 224 grams of crude isocyanate, $$(CF_3)_2CFO(CF_2)_4(CH_2-CH_2)(CH_2)_8NCO$$

which is about an 87% conversion of acid to isocyanate.

Pure isocyanate was obtained as a colorless oil, B.P. 119–119.5° C. at 0.5 mm. of Hg. Analysis of the product gave the following results:

Calculated for $C_{18}H_{20}F_{15}NO_2$ (percent): C, 38.1; H, 3.53; N, 2.46. Found (percent): C, 38.0; H, 3.90; N, 2.94. The infrared spectrum exhibited the characteristic strong absorption of the isocyanate group at 4.4µ.

Example 2

Slowly added 240 grams (2.0 moles) of thionyl chloride to 114 grams (0.2 moles) of $$(CF_3)_2CFO(CF_2)_4(CH=CH)(CH_2)_8COOH$$

at about 10° C. Slowly heated mixture to reflux temperature and held for 2 hours. Cooled to room temperature and evaporated to dryness under vacuum to give 120 grams of crude acid chloride.

The crude acid chloride was dissolved in 300 ml. of benzene at 10° C. and 12.1 grams of N,N-dimethylaniline was added followed by the slow addition of 16.3 grams (0.25 mole) of activated sodium azide and 100 ml. water. The reaction mixture was stirred at room temperature for 3 hours after which the benzene layer was separated, washed twice with 150 ml. of 10% HCl and once with 150 ml. of ice water and then dried over anhydrous sodium sulfate. The dried solution was heated to reflux causing rapid $N_2$ evolution and then held at reflux for 1 hour. The solution was then evaporated to dryness under vacuum to give 110 grams of crude isocyanate, $$(CF_3)_2CFO(CF_2)_4-(CH=CH)(CH_2)_8NCO$$

Pure isocyanate was obtained having a boiling point of 117–118° C. at 0.5 mm. of Hg. Analysis of the product gave the following results:

Calculated for $C_{18}H_{18}F_{15}NO_2$ (percent): C, 38.2; H, 3.19; N, 2.48. Found (percent): C, 38.1; H, 3.26; N, 2.73.

Example 3

Samples of cotton cloth were saturated with a 1% by weight solution of $$(CF_3)_2CFO(CF_2)_4(CH_2-CH_2)(CH_2)_8NCO$$

in acetone and dried for about 16 hours. The samples were then tested for oil repellency and for water repellency.

The procedure employed in determining the oil repellency ratings is described, for example, on pages 323–4 of the Aprli, 1962 edition of the Textile Research Journal. This procedure involves gently placing on the treated fabric drops of mixtures of mineral oil and n-heptane in varying proportions. The drops are allowed to stand on the treated fabric undisturbed for 3 minutes, after which the wetting and penetration of the fabric is usually observed. The number corresponding to the mixture containing the highest percentage of heptane which does not penetrate or wet the fabric is considered to be the oil repellency rating of the treated fabric. A rating of 70 or higher is considered good.

Water repellency was determined according to the spray test, method No. 22–52, published in the 1952 edition of the Technical Manual and Yearbook of the American Association of Textile Chemists and Colorists, vol. 28, p. 130. Good water repellents have ratings between about 70–100.

The cotton samples showed an oil repellency of 70 and a water repellency of 70.

I claim:

1. A compound of the formula

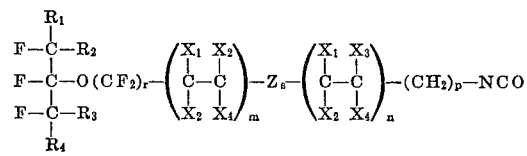

wherein
(a) $R_1$–$R_4$ can be independently selected from the group consisting of fluorine, chlorine and perhaloalkyl groups of 1 to 10 carbon atoms, or one of $R_1$ and $R_2$ and one of $R_3$ and $R_4$ when taken together may form a perhalocycloalkyl structure, the halo portions of $R_1$–$R_4$ being fluorine or chlorine, with the provisos that each carbon atom of $R_1$–$R_4$ contain at least one fluorine atom, no more than three of $R_1$–$R_4$ are perhaloalkyl groups, $R_1$ and $R_2$ cannot both be chlorine and $R_3$ and $R_4$ cannot both be chlorine;
(b) $X_1$–$X_4$ independently can be hydrogen, fluorine, chlorine or bromine, provided that each $X_1$–$X_4$ group does not include more than two chlorine atoms or one bromine atom, and when $X_1$ and $X_3$ independently are each hydrogen or fluorine, each of $X_2$ and $X_4$ independently may be $R_5$ wherein $R_5$ is a haloalkyl radical of 1 to 9 carbon atoms in which the halogen atoms are fluorine, chlorine or bromine; the $(X_1X_2C\text{—}CX_3X_4)_m$ moieties may be the same or different;
(c) Z is —CH$_2$—CH$_2$— or —CH=CH—, with the proviso that when Z is —CH=CH, one of $X_3$ or $X_4$ in the $(X_1X_2C\text{—}CX_3X_4)_m$ moiety must be a halogen atom;
(d) $r$ is an integer from 1–2, $m$ and $n$ are integers from 0–20, the sum of $m$ and $n$ is 0–20, $p$ and $s$ are integers from 0–1, with the proviso that when $p$ is 0, $n$ must be at least one and $X_3$ and $X_4$ in the $X_1X_2C\text{—}CX_3X_4)_n$ moiety must be hydrogen.

2. A compound according to claim 1 wherein $m$ and $n$ are integers from 0–10.

3. A compound according to claim 2 wherein the —$(X_1X_2C\text{—}CX_3X_4)$— moieties are idependently selected from the group consisting of —CF$_2$—CF$_2$—,

—CF$_2$—CH$_2$

—CF$_2$—CClF—, and —CH$_2$CH$_2$—.

4. A compound according to claim 3 wherein $R_1$–$R_4$ independently are fluorine or perfluoroalkyl groups of 1–3 carbon atoms.

5. A compound according to claim 4 wherein $X_1$–$X_4$ are hydrogen, fluorine or chlorine.

6. A compound according to claim 5 wherein $R_1$–$R_4$ are fluorine.

7. A compound according to claim 6 wherein Z is
—CH$_2$—CH$_2$—
and $s$ is 1.

8. A compound according to claim 6 wherein Z is —CH=CH— and $s$ is 1.

9. A compound of the formula

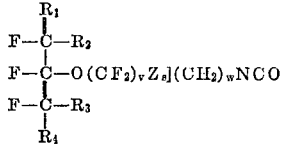

wherein $R_1$–$R_4$ independently can be fluorine, chlorine or perhaloalkyl groups of 1 to 10 carbon atoms or one of $R_1$ and $R_2$ and one of $R_3$ and $R_4$ when taken together may form a perhalocycloalkyl structure, the halo portions fo $R_1$–$R_4$ being fluorine or chlorine, with the provisos that each carbon atom of $R_1$–$R_4$ contain at least one fluorine atom, no more than three of the $R_1$–$R_4$ groups are perhaloalkyl groups, $R_1$ and $R_2$ cannot both be chlorine and $R_3$ and $R_4$ cannot both be chlorine; Z is
—CH$_2$—CH$_2$— or —CH=CH—
$s$ is an integer from 0 to 1 and $v$ and $w$ are integers from 1 to 20.

10. A compound according to claim 9 wherein $R_1$–$R_4$ independently can be fluorine or perfluoroalkyl groups of 1 to 3 carbon atoms.

11. A compound according to claim 10 wherein $v$ and $w$ are integers from 1 to 10.

12. A compound according to claim 11 wherein $s$ is 0.

13. A compound according to claim 11 wherein $s$ is 1.

14. A compound according to claim 11 wherein $R_1$–$R_4$ are fluorine.

15. A compound according to claim 14 wherein $s$ is 0.

16. A compound according to claim 14 wherein Z is —CH$_2$—CH$_2$— and $s$ is one.

17. A compound according to claim 14 wherein Z is —CH=CH— and $s$ is one.

18. A compound according to claim 16 of the formula $(CF_3)_2CFO(CF_2)_2(CH_2\text{—}CH_2)(CH_2)_8NCO$.

19. A compound according to claim 16 of the formula $(CF_3)_2CFO(CF_2)_4(CH_2\text{—}CH_2)(CH_2)_8NCO$.

20. A compound according to claim 16 of the formula $(CF_3)_2CFO(CF_2)_6(CH_2\text{—}CH_2)(CH_2)_8NCO$.

21. A compound according to claim 16 of the formula $(CF_3)_2CFO(CF_2)_8(CH_2\text{—}CH_2)(CH_2)_8NCO$.

22. A compound according to claim 17 of the formula $(CF_3)_2CFO(CF_2)_2(CH=CH)(CH_2)_8NCO$.

23. A compound according to claim 17 of the formula $(CF_3)_2CFO(CF_2)_4(CH=CH)(CH_2)_8NCO$.

24. A compound according to claim 17 of the formula $(CF_3)_2CFO(CF_2)_6(CH=CH)(CH_2)_8NCO$.

25. A compound according to claim 17 of the formula $(CF_3)_2CFO(CF_2)_8(CH=CH)(CH_2)_8NCO$.

References Cited
UNITED STATES PATENTS
2,860,154  11/1958  Bauer _____ 260—453

JOSEPH REBOLD, Primary Examiner

D. H. TORRENCE, Assistant Examiner

U.S. Cl. X.R.

8—116.2, 127.6; 117—138.5, 139.5, 142; 252—8.57, 8.6, 352; 260—349, 405.5, 408, 453 A 457, 458, 464, 465.6, 468 R, 484 R, 514 R, 531 R, 535 H, 544 F and Y, 611 R, 614 F

UNITED STATES PATENT OFFICE
CERTIFICATE OF CORRECTION

Patent No. 3,657,306　　　　　　　　　　Dated April 18, 1972

Inventor(s) John J. Murray

It is certified that error appears in the above-identified patent and that said Letters Patent are hereby corrected as shown below:

Col. 5, 3rd. formula –

"
$$\begin{array}{c} R_1 \\ | \\ F-C-R_2 \\ | \\ F-C-O-CF_2CF_2(X_1X_2C-CX_3X_4)I \\ | \\ F-C-R_3 \\ | \\ R_4 \end{array}$$
"

should read

–
$$\begin{array}{c} R_1 \\ | \\ F-C-R_2 \\ | \\ F-C-O-CF_2CF_2(X_1X_2C-CX_3X_4)I \\ | \\ F-C-R_3 \\ | \\ R_4 \end{array}$$
– ;

Col. 5, line 45 – "corersponding" should read -- corresponding –

Col. 10, line 48 – "Aprli" should read -- April --;

Col. 11, line 21 – after "$(X_1X_2C-CX_3X_4)_m$" insert
-- and $(X_1X_2C-CX_3X_4)_n$ --

UNITED STATES PATENT OFFICE
CERTIFICATE OF CORRECTION

Patent No. U.S.P. 3,657,306      Dated April 18, 1972

Inventor(s) John J. Murray

It is certified that error appears in the above-identified patent and that said Letters Patent are hereby corrected as shown below:

Col. 11, line 37 - after "$-CF_2-CH_2$" insert -- , -- ;

Col. 11, last formula -

$$\begin{array}{c} R_1 \\ | \\ F-C-R_2 \\ | \\ F-C-O(CF_2)_v Z_s ](CH_2)_w NCO \\ | \\ F-C-R_3 \\ | \\ R_4 \end{array}$$

should read --

$$\begin{array}{c} R_1 \\ | \\ F-C-R_2 \\ | \\ F-C-O(CF_2)_v Z_s (CH_2)_w NCO \\ | \\ F-C-R_3 \\ | \\ R_4 \end{array}$$ --;

Col. 12, line 10 - after "$-CH_2-CH_2-$ or $-CH=CH-$" insert -- ; --.

Signed and sealed this 7th day of May 1974.

(SEAL)
Attest:

EDWARD M. FLETCHER, JR.
Attesting Officer

C. MARSHALL DANN
Commissioner of Patents